United States Patent
Shaikh et al.

(10) Patent No.: US 8,806,413 B2
(45) Date of Patent: Aug. 12, 2014

(54) GRADIENT AOCV METHODOLOGY ENABLING GRAPH-BASED TIMING CLOSURE WITH AOCV TIMING MODELS

(71) Applicant: Texas Instruments Incorporated, Dallas, TX (US)

(72) Inventors: Raashid Moin Shaikh, Bangalore (IN); Vishnuraj Arukat Rajan, Kerala (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 14/028,834

(22) Filed: Sep. 17, 2013

(65) Prior Publication Data

US 2014/0082576 A1   Mar. 20, 2014

Related U.S. Application Data

(60) Provisional application No. 61/702,044, filed on Sep. 17, 2012.

(51) Int. Cl.
*G06F 17/50* (2006.01)

(52) U.S. Cl.
USPC ............ 716/134; 716/113; 716/123; 716/126

(58) Field of Classification Search
USPC .................................. 716/113, 123, 126, 134
See application file for complete search history.

(56) References Cited

U.S. PATENT DOCUMENTS

| | | | | |
|---|---|---|---|---|
| 6,415,422 | B1 * | 7/2002 | Mehrotra et al. | 716/115 |
| 7,197,728 | B2 * | 3/2007 | Yonezawa | 716/56 |
| 7,480,881 | B2 * | 1/2009 | Tetelbaum et al. | 716/113 |
| 8,099,702 | B2 * | 1/2012 | Hou et al. | 716/131 |
| 8,117,575 | B2 * | 2/2012 | Lu et al. | 716/106 |
| 8,336,010 | B1 * | 12/2012 | Chang et al. | 716/108 |
| 8,365,115 | B2 * | 1/2013 | Liu et al. | 716/108 |
| 2010/0229137 | A1 * | 9/2010 | Liu et al. | 716/6 |
| 2011/0107291 | A1 * | 5/2011 | Barwin et al. | 716/134 |
| 2013/0227510 | A1 * | 8/2013 | Katz et al. | 716/113 |
| 2013/0239079 | A1 * | 9/2013 | Tetelbaum | 716/113 |

* cited by examiner

*Primary Examiner* — Naum Levin
(74) *Attorney, Agent, or Firm* — Robert D. Marshall, Jr.; W. James Brady; Frederick J. Telecky, Jr.

(57) ABSTRACT

A method of manufacturing semiconductor circuits seeks timing closure on a preliminarily select, placed and routed set of cells using a delay for each cell as derated by a derate value obtained from a timing model table having a derate value corresponding to a circuit path depth in the netlist. The derate value for a predetermined number of circuit path depths below k are identical. The derate values are monotonically decreasing for increasing circuit depths in a range between 1.0 and 1.5. Separate timing model tables with differing identical values can be employed for standard and clock tree cells.

15 Claims, 3 Drawing Sheets

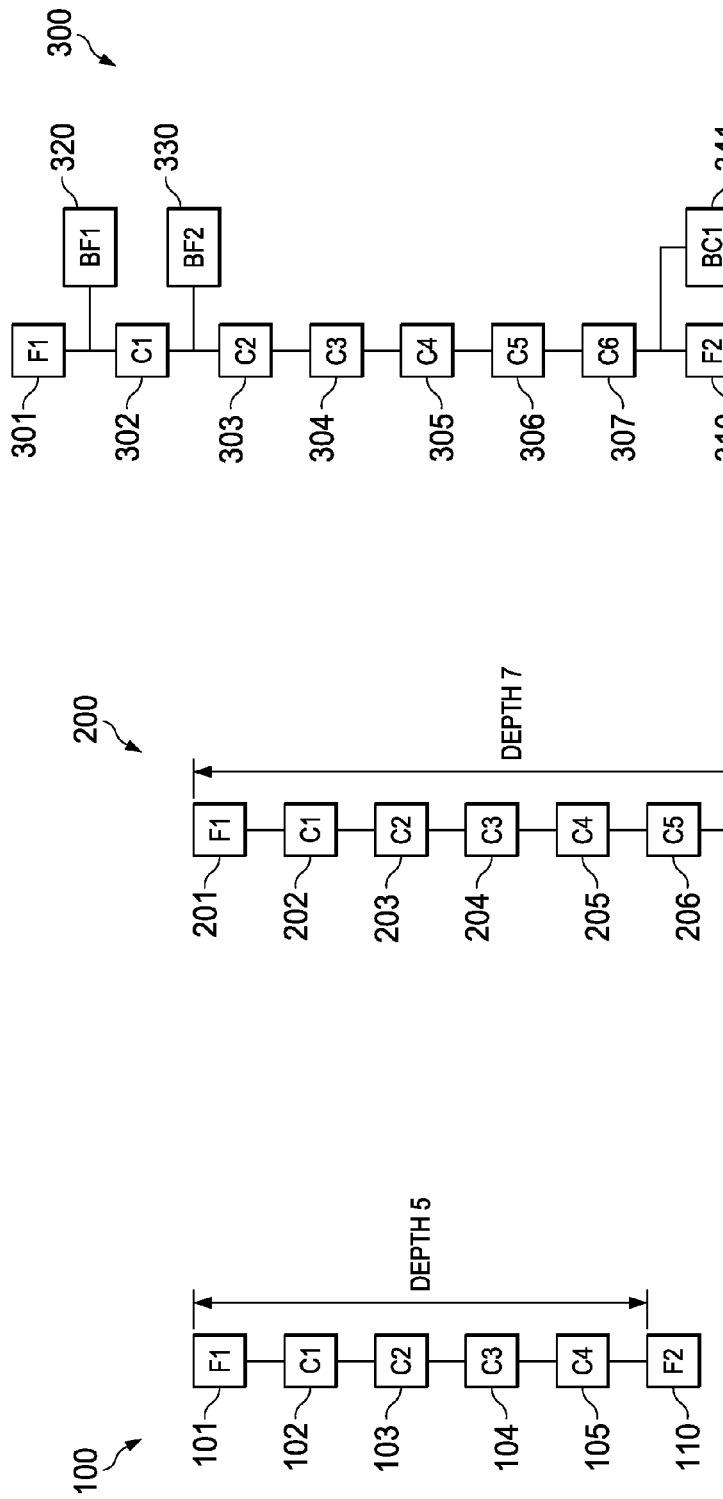

GRADIENT AOCV METHODOLOGY ENABLING GRAPH-BASED TIMING CLOSURE WITH AOCV TIMING MODELS

CLAIM OF PRIORITY

This application claims priority under 35 U.S.C. 119(e)(1) to U.S. Provisional Application No. 61/702,044 filed Sep. 17, 2012.

TECHNICAL FIELD OF THE INVENTION

The technical field of this invention is timing closure in integrated circuit design.

BACKGROUND OF THE INVENTION

This invention related to Graph Based Analysis (GBA) Advanced On Chip Variation (AOCV) Timing Correlation to Path Based Analysis (PBA) Timing and AOCV Comprehension during layout optimization. This invention reduces GBA AOCV Timing Pessimism and improves Performance, Power-Active, Power-Leakage and Area (PPPA) performance.

Synchronous digital circuits are designed for operation at specific clock frequencies. The goals of synthesis and place and route (PnR) optimizations is to realize this frequency of operation in real design layout. Timing closure is the effort expended towards meeting the frequency of operation goals of the design/circuit during the layout. Timing closure involves place and route iterations along with timing analysis of the design including static timing analysis (STA) of the design. Static timing analysis is the verification/checking part of the flow. Place and Route iterations form the implementation flow.

Place and Route tools employ timing driven algorithms to ensure frequency goals are met. The accuracy of the timing analysis is limited using the typically employed graph based analysis method. The signoff STA tools/flows employ path based analysis methods for timing path analysis. These will be described below.

Both PnR tools and STA tools, use the following inputs in timing analysis. The Netlist is a design representation consisting of connections of standard cells and macros such as, etc. Parasitics are the RC-network (resistance/capacitance) representation of the connecting wires. Timing models represent the timing delay of standard cells, memory models, etc. User constraints include: the clock frequency definitions and other timing checks; margins which are additional subtractive components modeling variations due to phase locked loop (PLL) clock source; and derates which are additional slow-down multipliers for modeling on-chip variations like dynamic voltage fluctuations, transistor random variations, etc. These derates may be in the form of AOCV derates. Based on these inputs, the STA tools check the design timing status versus the timing goals which are dependent upon the user specified frequency of operation.

This invention is specific to the AOCV derate usage in PnR flows. Derates work as follows. If the cell delay, based on the context of the cell usage, inputs transition and the output load for the cell, recalled up a timing model table is S and the derate is D then: the non-derated STA delay is S; the derate applied is D; and the derated STA delay of the cell is S*D. For frequency checks, D is usually greater than 1.0 and generally between 1.0 and 1.5. Thus the derate slows down the cell and makes it harder to meet the frequency goals. Derates can be global where every cell in the design gets the same multiplier or context dependent. Context dependent derate is known as AOCV derate.

Context dependent AOCV derates are a function of depth of a cell in the path. FIGS. 1, 2 and 3 illustrate various circuit depths. FIG. 1 illustrates a path depth of 5. The circuit path 100 includes cell F1 101, cell C1 102, cell C2 103, cell C3 104, cell C4 105 and check point cell F2 110 which does not participate in the delay calculation. Thus the path depth of circuit 100 is 5. FIG. 2 illustrates a path depth of 7. The circuit path 100 includes cell F1 201, cell C1 202, cell C2 203, cell C3 204, cell C4 305, cell C4 206, cell C6 207 and check point cell F2 110 which does not participate in the delay calculation. Thus the path depth of circuit 200 is 7.

FIG. 3 illustrates calculation of path depth in a branching path. FIG. 3 illustrates a main path including cell F1 301, cell C1 302, cell C2 303, cell C3 304, cell C4 305, cell C4 306, cell C6 307 and check point cell F2 310 which does not participate in the delay calculation. A first branch path includes cell F1 and first branch check point cell BF1. A second branch includes cell F1, cell C1 302 and second branch check point cell BF2. A third branch includes cell F1 301, cell C1 302, cell C2 303, cell C3 304, cell C4 305, cell C4 306, cell C6 307, branch cell BC1 341, branch cell BC2 342, branch cell BC3 343 and third check point cell BF3. The various paths for each cell are shown in Table 1.

TABLE 1

|  | F1 | C1 | C2 | C3 | C4 | C4 | C6 |
|---|---|---|---|---|---|---|---|
| Shortest path Depth | 1 | 2 | 7 | 7 | 7 | 7 | 7 |
| Longest path Depth | 10 | 10 | 10 | 10 | 10 | 10 | 10 |
| Actual path Depth | 7 | 7 | 7 | 7 | 7 | 7 | 7 |

For the circuit illustrated in FIG. 3 the relevant path being tested for speed is cell F1 301, cell C1 302, cell C2 303, cell C3 304, cell C4 305, cell C4 306, cell C6 307 and check point cell F2 310. A Graph Based Analysis (GBA) delay calculation assumes derates corresponding to the SHORTEST depth of a cell. A Path Based Analysis (PBA) analysis considers a depth of the path for derate lookup in the AOCV table. If the derates for depth i is Di then the GBA Path Delay is:

$$F1*D1+C1*D2+C3*D7+C4*D7+C5*D7+C6*D7,$$

and the PBA Path Delay is:

$$F1*D7+C1*D7+C3*D7+C4*D7+C5*D7+C6*D7.$$

The difference between very low depth derates and very high depth derates can be high. Derates D1 and D2 may be as high as 1.4, while the derate D30 may be 1.05. Thus GBA analysis may be extremely pessimistic and lead to waste of time and resources solving the wrong problem. Generally the derates D1>D2>D3 ... Dn>Dn+1. Thus the derate gets lower as the path depth increases.

FIG. 4 illustrates a prior art AOCV table. In the prior art table illustrated in FIG. 4, each depth 101 to 103 ... 111 to 112 ... 120 is matched with a corresponding derate value 131 to 133 ... 141 to 142 ... 150. In accordance with the prior art each derate value 131 to 133 ... 141 to 142 ... 150 is unique.

Example FIG. 1

Path Depth: 5 (F1, C1, C2, C3, C4)
Derate Used: Derate5
Path Delay: (F1+C1+C2+C3+C4)*Derate5

Example FIG. 2

Path Depth: 7 (F1, C1, C2, C3, C4, C5, C6)
Derate Used: Derate5
Path Delay: (F1+C1+C2+C3+C4+C5+C6)*Derate7

SUMMARY OF THE INVENTION

This invention uses a modified/custom Advanced On Chip Variation (AOCV) Tables based on design depth profile derived from standard AOCV tables provided by a library team. This invention enables direct use of AOCV tables modified for optimization. There is no need of layout tool to signoff tool iterations to identify instance/cell based derates. There is no need for any flat derates to be applied. Cells still have multiple derates possible versus constant derate in case of cell/instance based solution enabling accurate delay estimation for paths with various depth.

This invention provides AOCV Comprehension during all stages of layout optimization. This invention reduces pessimism with Graph based AOCV Timer numbers. This invention provides improved Correlation between Path based timing numbers versus Graph based timing numbers. This invention enables near Path Based Analysis (PBA) AOCV timing closure using Electronic Design Automation (EDA) tools capable of only doing GBA AOCV timer update. This invention improves crosstalk modeling. This invention removes many false window overlappings. This invention reduces area/power used due to G AOCV pessimism reduction. This invention provides improved TAT. This invention reduces ECO cycles as layout timing is well correlated to signoff.

BRIEF DESCRIPTION OF THE DRAWINGS

These and other aspects of this invention are illustrated in the drawings, in which:

FIG. 1 illustrates a circuit example with a path depth of 5 (prior art);

FIG. 2 illustrates another circuit example with a path depth of 7 (prior art);

FIG. 3 illustrates a branching circuit example with a path depth of 7 (prior art);

DETAILED DESCRIPTION OF PREFERRED EMBODIMENTS

Figure 4:
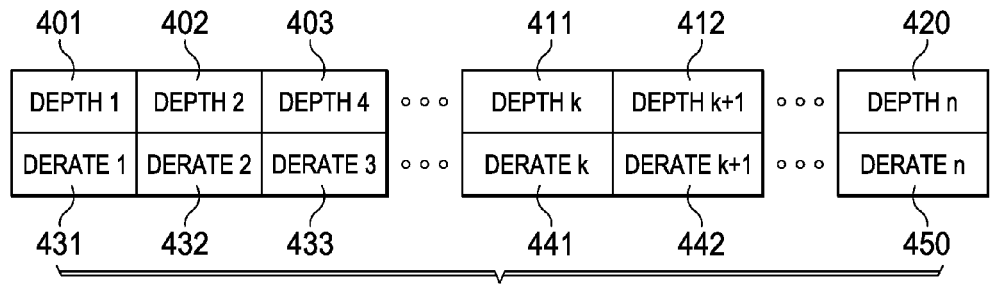
FIG. 4 illustrates an example prior art Advanced On Chip Variation (AOCV) table.

This invention concerns timing closure in integrated circuit design. Timing closure means that the circuit of the integrated circuit preforms its intended function in a timely manner to feed other subsequent functions.

A technique called variation comprehension in layout optimization is often used for effective timing closure and to reduce signoff-timer to layout iterations. A typical prior art technique uses flat derate based closure which employs very pessimistic assumptions for safety. These pessimistic assumptions result in increased area and power requirements than are necessary. These pessimistic assumptions may result in some designs that cannot be closed. This means that the designed circuit cannot be assured of operating correctly at the intended speed. Thus it is not practical to derive a single flat derate covering whole library The prior art includes the following techniques to attempt to solve this problem. The first such technique is custom cell based derates (CSD). In custom cell based derates a design depth and index into an Advanced On Chip Variation (AOCV) table is selected for the cell to determine a derate number. This derate number is used as derate for the cell throughout optimization cycle. The second technique is Instance Based derates (ISD). Instance Based derates generates instance based derates depending on the level in which the instance get used in violating timing path. Both methods gives a constant derate to a cell which may be pesimistic/optimistic based on the path depth.

There are the following techniques for a current semiconductor processing technology. A flat derate is feasible. A particular semiconductor processing technology may need very high flat derates because the variability is high. With flat derate timing closure is difficult with flat margins as worst case derate is very high. The combination of CSD/ISD (described above) needs static timing analysis (STA) tool intervention to generate margins. This generally produces high run times in generating margins post route. This is not a global solution because different blocks need different derate based on depth profile. This technique provides poor correlation to GBA timer numbers because cell derate is a function of path depth. The GBA AOCV technique is very pessimistic because short paths can bias the derates heavily. Post-route closure is difficult. This technique does provide very good coverage.

This invention attempts to reduce pessimism in GBA AOCV while maintaining coverage. This invention is a Gradient AOCV Flow. This invention creates design dependent AOCV tables using standard AOCV information from the cell library. A new AOCV table is created using the probability of a short path failing setup is very low if layout is optimized within a tight slew and cap envelop. This invention determines that there is generally no need to have derates for shallow depth in AOCV table for setup analysis. Short paths do not fail setup if optimized inside tight electrical limits. The same is true for short paths for hold.

The invention alters the AOCV tables so that the GBA analysis is not very different from the PBA signoff STA analysis. The Place and Route tools see the right problems when using this invention and resulting in a significant jump in productivity.

For the example circuit illustrated in FIG. 2, the prior art GBA Path Delay is:

F1*D1+C1*D2+C3*D7+C4*D7+C5*D7+C6*D7,
and the PBA Path Delay is:

F1*D7+C1*D7+C3*D7+C4*D7+C5*D7+C6*D7.

Design analysis shows that the median path depth in a current example design is 6. This example of the invention changes the AOCV tables such that D1=D2=D3=D5=D5=D6.

This invention creates a k Level Gradient AOCV by replacing derate values for all levels less than k with the Level k derate value. This reduces pessimism from short paths and enables different levels of pessimism with multiple tables.

Figure 5:
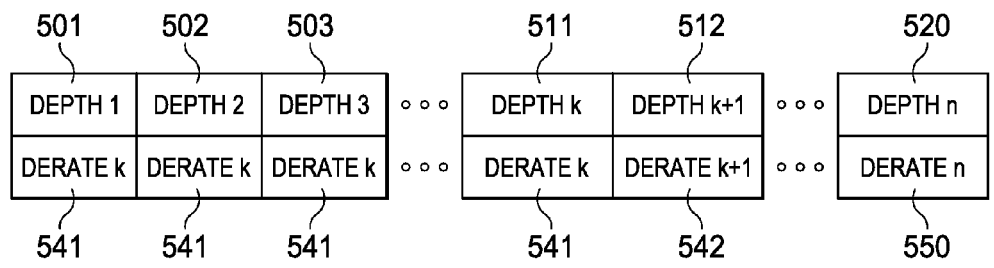
FIG. 5 illustrates an example Advanced On Chip Variation (AOCV) table according to this invention.

FIG. 5 illustrates the gradient AOCV table of this invention. In the inventive table illustrated in FIG. 5, each to depth 201 to 203 ... 211 to 212 ... 220 is matched with a corresponding derate value. In FIG. 2 however depths 201 to 203 ... (depths<k) have the same derate value 241 as for depth k 211. Other depths 212 ... 220 are matched with corresponding unique derate values 242 ... 250. A preferred embodiment of this invention uses a k cutoff depth of 30 for standard cells and of 50 for Clock Tree Synthesis (CTS) cells.

Using the inventive AOCV table the GBA Path Delay is:

F1*D6+C1*D6+C3*D7+C4*D7+C5*D7+C6*D7 because D1=D2=D6, and the PBA Path Delay is:

F1*D7+C1*D7+C3*D7+C4*D7+C5*D7+C6*D7 which is unchanged from the prior art value in this example.

Figure 6:
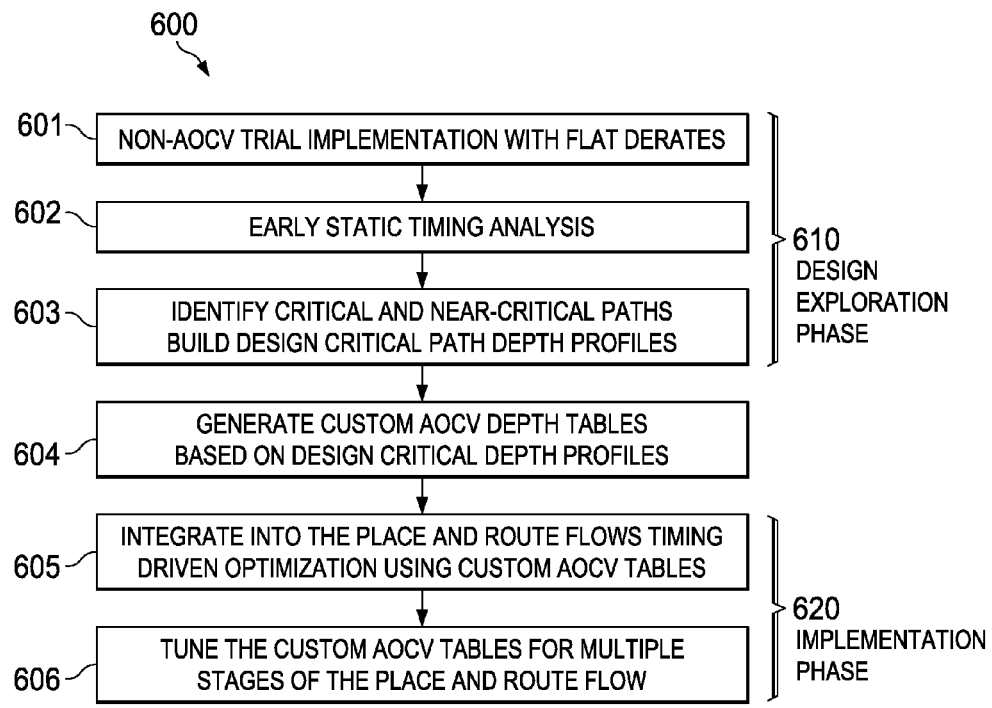
FIG. 6 illustrates a first example of flow 600 of this invention.

FIG. 6 illustrates a first example of flow 600 of this invention. Block 601 performs an non-AOCV trial implementation with flat detates. Block 602 is an early static timing analysis (STA). Block 603 identifies critical and non-critical paths and builds design critical path profiles. As shown in FIG. 6, blocks 601, 602 and 603 constitute Design Exploration Phase 610.

Block 604 generates the custom AOCV depth table of this invention based upon the design critical path depth profiles according to block 603.

Block 605 integrates into the place and route (PNR) flows the timing driven optimization using the custom AOCV tables. Block 606 tunes the custom AOCV table for multiple stages of the place and route (PnR) flow. Blocks 605 and 606 constitutr Implementation Phase 620.

This invention generates a custom AOCV table for use with GBA timing analysis in the implementation tools (PnR). This invention modifies the existing signoff AOCV tables based on design critical path learning. This invention is not a signoff closure scheme using place and route tools and GBA analysis.

This invention is unique from other schemes such as flat global derates, STA based timing optimization loops and the like. The productivity gain of this invention is seen as GBA timing analysis in timing driven place and route flows will see similar critical paths as the PBA STA engines in terms of derates and hence the PPPA optimization goals will be real and not overtly pessimistic. This invention minimizes over optimization and hence results in power and area savings. This invention is based on design learning which is usually done in the early part of design exploration. Tedious repetitions and iterations with STA are avoided. This invention thus saves time.

This invention does not preclude STA-to-PnR timing analysis correlation tuning methods such as flat margins, endpoint margins, additional uncertainty, wire delay multipliers and the like. This invention is not restricted to a method for extracting design specific minimum depth limits. The minimum depth levels of this invention may be different for each standard cell, family of standard cells and the like. This invention poses no restrictions on the design critical path driven selection of minimum depth levels. Multiple statistical methods, such as mean path depth, median of the critical path distribution and the like, may be used with this invention.

Figure 7:
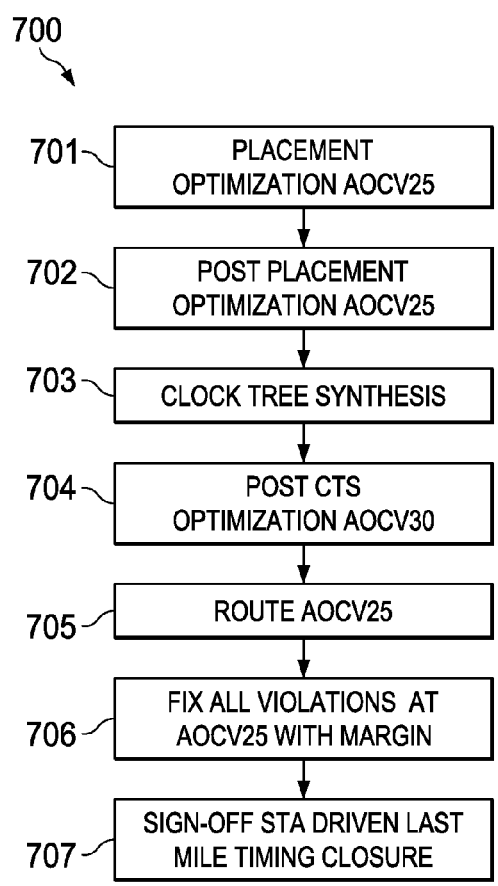
FIG. 7 illustrates the details of flow used in this invention.

FIG. 7 illustrates the details of a flow 700 used in this invention. Flow 700 employs learning through the trial explorations integrated in terms of disconnect margins and multiple threshold-clipped custom AOCV table usage. This flow begins with placement optimization of cells at AOCV25 in block 701. This block uses an AOCV table modified according to this invention with a value k equal to 25. This value of k is an example only. Flow 700 next performs a post placement optimization of cells at AOCV25 in block 702. The flow then performs clock tree synthesis to generate the circuit clock tree in block 703. Next is post clock tree synthesis optimization at AOCV30 in block 704. This block uses an AOCV table modified according to this invention with a value k equal to 30 in this example. The flow next performs routing at AOCV25 in block 705. The flow fixes violations at AOCV30 with margin according to timer correlation of 70 pS in block 706. Lastly, the flow 700 completes by signing-off STA driven last mile timing closure in block 707.

Using a derate table with k depth and not just one derate value per standard cell gives the following benefits. The sign-off AOCV tables have different derates for different cell famillies. This invention doesn't mix them up and introduce pessimism/optimism in timing analysis. Because the gradient AOCV tables of this invention are monotonically decreasing, for paths that are deeper than the trim threshold k, the place and route tool can use the lower derates available in the signoff AOCV tables. This improves power-leakage and area performance.

The ISD/CSD approach of the prior art makes a single cut on derate graph. This brings in pessimism in analysis as even deeper paths gets same derate. In the gradient AOCV of this invention the place and route (PnR) tool still sees the graph beyond the cut point. This enables accurate delay estimation.

The gradient AOCV Table is created as follows. The level to be used to cut the AOCV graph for cells in library is derived from design depth analysis. This depth is chosen to cover 95% of violating endpoints. Input/outputs (IOs) are handled via extra uncertainty on virtual clocks.

This invention may include separate derate tables for clock and data. Separate tables are advantageous because launch and capture depths are very different. One example used a launch depth of 30 and a capture depth of 11 in the separate gradient AOCV tables.

The Gradient AOCV Flow Advantage of this invention has these advantages. This invention does not require Signoff tool intervention to derive the derates. This invention covers a larger part of AOCV derate range reducing optimism in the prior art CSD/ISD technique. This invention reduces GBA AOCV pessimism by hiding low depth derates from the AOCV table. This invention enables near PBA AOCV timing closure with GBA AOCV timer. This invention has no nworst limitations, GBA AOCV is guaranteed to cover PBA AOCV assuming full timer correlation between implementation and signoff timers. This invention provides detter crosstalk comprehension compared to margin flow.

With this invention tables can be used along with any optimization tool supporting GBA AOCV timer updates. The tables of this invention can be user right from placement stage providing maximum PPPA improvement. This invention enables the entire flow to be automated using custom scripts.

This invention was applied to an example design having a cell count of 700 K with a power density of 300 mw/mm$^2$. This example design has a utilization of 77% with Flat derates and of 73% with this invention. Table 2 shows a comparison of this invention and various prior art techniques.

TABLE 2

| Table Used | WNS | TNS | FEP |
|---|---|---|---|
| With Original AOCV Table | −2811.61 | −2E+07 | 75100 |
| With Gradient AOCV at Depth 30 | −2211.57 | −5957755 | 36681 |
| With Flat derates | | | 42102 |

This invention allows reduced pessimism involved in traditional AOCV graph based optimization/analysis. This invention reduces the gap between PBA slack and AOCV GBA Slack. This invention allows EDA tools to optimize the design with the right slack picture. This invention provides an improved PPPA due to a reduced power envelope, reduced area and reduced die size.

What is claimed is:

1. A method of manufacturing semiconductor circuits comprising the steps of:
   preliminarily selecting a set of cells to implement a circuit design expressed as a netlist;
   preliminarily placing said set of cells in positions corresponding to the netlist;
   preliminarily routing connections between said set of cells corresponding to the netlist;
   determining whether said preliminarily selected, placed and routed set of cells achieves timing closure using a delay for each cell of said set of cells as derated by a derate value obtained from a timing model table having a derate value corresponding to a circuit path depth in the netlist, said derate value for a predetermined number of circuit path depths below k being identical;
   repeating said steps of preliminarily selecting, preliminarily placing, preliminarily routing and determining until timing closure is achieved; and
   constructing a circuit in a semiconductor having cells selected, placed and routed to achieve timing closure.

2. The method of claim 1, wherein:
   said derate value monotonically decreases for increasing circuit path depth.

3. The method of claim 2, wherein:
   said derate values are greater than 1.0.

4. The method of claim 3, wherein:
   said derate values are greater than 1.0 and less than 1.5.

5. The method of claim 1, wherein:
   said step of determining includes
   a first determining for standard cells employing a first timing model table with a first predetermined number k1, and
   a second determining for clock tree cells employing a second timing model table with a second predetermined number k2, where k2>k1.

6. The method of claim 1, wherein:
   said step of determining includes
   identifying design critical path profiles in said preliminarily selected, placed and routed set of cells
   generating said timing model table based upon the identified design critical path depth profiles.

7. A method of designing semiconductor circuits comprising the steps of:
   preliminarily selecting a set of cells to implement a circuit design expressed as a netlist;
   preliminarily placing said set of cells in positions corresponding to the netlist;
   preliminarily routing connections between said set of cells corresponding to the netlist;
   determining whether said preliminarily selected, placed and routed set of cells achieves timing closure employing an electronic design automation tool using a delay for each cell of said set of cells as derated by a derate value obtained from a timing model table having a derate value corresponding to a circuit path depth in the netlist, said derate value for a predetermined number of circuit path depths below k being identical;
   repeating said steps of preliminarily selecting, preliminarily placing, preliminarily routing and determining until timing closure is achieved.

8. The method of claim 7, wherein:
   said derate value monotonically decreases for increasing circuit path depth.

9. The method of claim 8, wherein:
   said derate values are greater than 1.0.

10. The method of claim 9, wherein:
    said derate values are greater than 1.0 and less than 1.5.

11. The method of claim 7, wherein:
    said step of determining includes
    a first determining for standard cells employing a first timing model table with a first predetermined number k1, and
    a second determining for clock tree cells employing a second timing model table with a second predetermined number k2, where k2>k1.

12. The method of claim 7, wherein:
    said step of determining includes
    identifying design critical path profiles in said preliminarily selected, placed and routed set of cells
    generating said timing model table based upon the identified design critical path depth profiles.

13. The method of claim 7, wherein:
    said step of preliminarily selecting employs said electronic design automation tool.

14. The method of claim 7, wherein:
    said step of preliminarily placing employs said electronic design automation tool.

15. The method of claim 7, wherein:
    said step of preliminarily routing connections employs said electronic design automation tool.

* * * * *